Aug. 3, 1937.  E. BREITLING ET AL  2,088,634
DIFFERENTIAL DEVICE FOR CASH REGISTERS, ACCOUNTING AND THE LIKE MACHINES
Filed June 12, 1935  2 Sheets-Sheet 1

Patented Aug. 3, 1937

2,088,634

UNITED STATES PATENT OFFICE 2,088,634

DIFFERENTIAL DEVICE FOR CASH REGISTERS, ACCOUNTING AND THE LIKE MACHINES

Ernst Breitling, Berlin-Tempelhof, and Julius Patzelt, Berlin, Germany, assignors to The National Cash Register Company, Dayton, Ohio, a corporation of Maryland Application June 12, 1935, Serial No. 26,115
In Germany June 13, 1934

4 Claims. (Cl. 235—14)

The invention relates to a differential device for cash registers, accounting and the like machines and more particularly to such devices in which certain elements return during the machine operation to their rest positions, while others connected with the indicating device and with the type wheels of the printer, remain in the set position at the end of a machine operation.

The main object of the invention is to provide new and reliable actuating and setting members for such a differential device to effect a correctly timed adjustment of the said members one of which is returned to zero position and the other element remains in the adjusted position.

Another object of the invention is to provide for positive coupling for certain actuating and setting elements which have to move in unison for a certain period of the machine operation.

Further objects of the invention will be pointed out in the following detailed description with reference to the annexed drawings.

A preferred form of an embodiment of the invention is shown in the annexed drawings.

Of said drawings:

Fig. 3 is a side view of the machine drive.

Machine Drive

Figure 1:
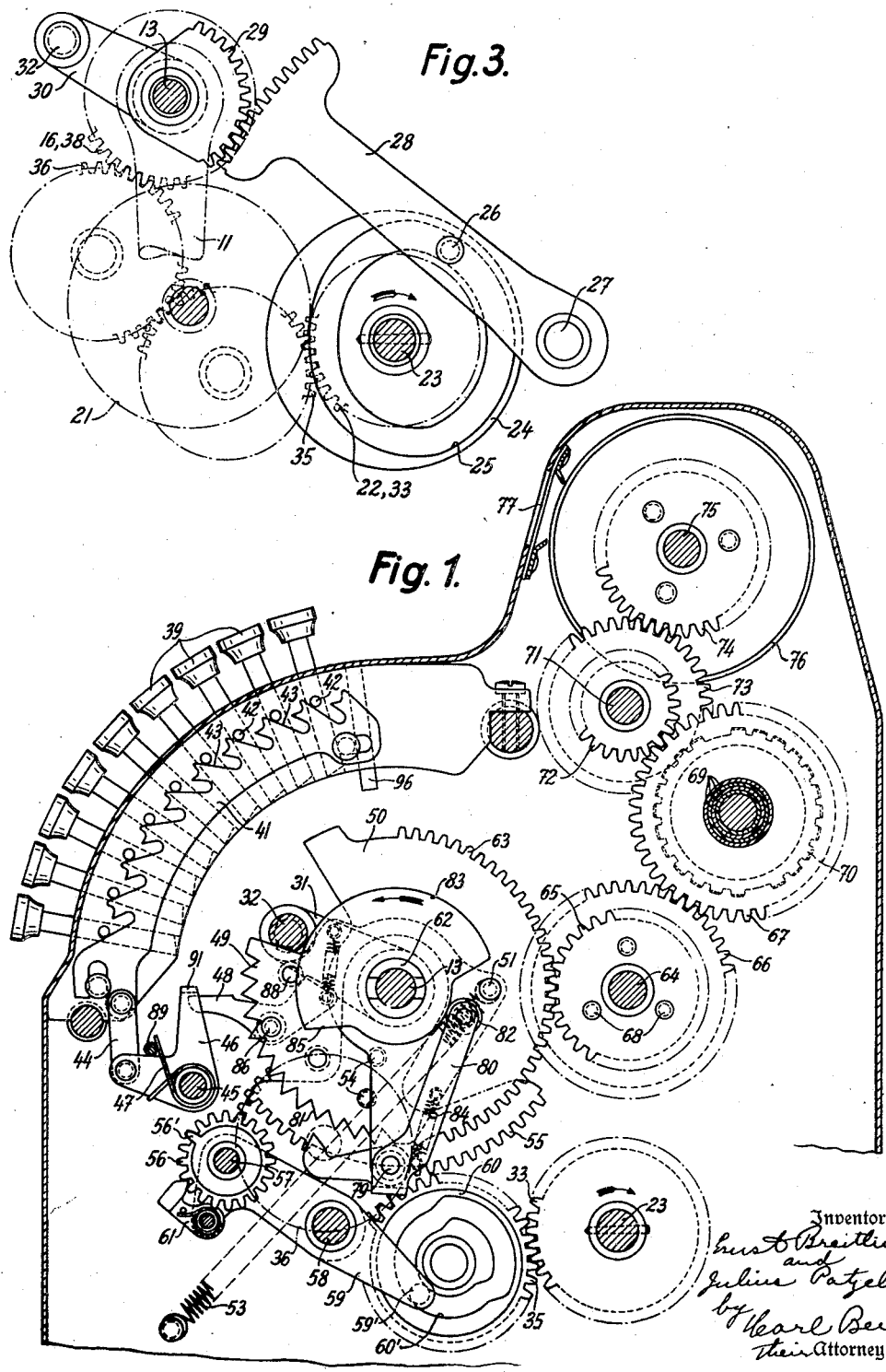
Fig. 1 is a side view of a cross section through the machine along a key bank.

The machine may be operated by means of a hand crank 11 (Figs. 2 and 3) rotatably mounted on a shouldered end 12 of a shaft 13. The shaft 13 is rotatably supported in the side walls 14 and 15 of the machine frame. Also, on the shouldered end 12 of the shaft 13 is rotatably mounted a gear 16 the hub 17 of which is provided with recesses 18 to be engaged by coupling tenons 19 of the crank hub 20. The gear 16 rotates a gear 22 on a shaft 23 by means of an intermediate pinion 21 rotatably mounted on a stationary stud of the side wall 14. The gears 22 and 16 are of like diameter, so that when the crank 11 is rotated through a full cycle, the shaft 23 performs a full revolution.

The shaft 23 rotatably supported in the side walls 14 and 15, has secured thereto a cam disk 24 having a curved groove 25 (Fig. 3) engaged by a roller 26 of a segment arm 28 pivoted on a stationary stud 27 of the side wall 14. The teeth of the arm 28 mesh with a toothed segment 29 fast on the hub of a carrier 30 secured to the shaft 13. During each machine operation, the cam disk 24 imparts to the arm 28, first, a rotary movement in counter-clockwise direction and, thereafter, in clockwise movement. These two rocking movements are transmitted, through the toothed segment 29, in the reversed sense to the shaft 13, so that the latter during each machine operation, is rocked first in clockwise and then in counter-clockwise direction. Besides the arm 30, the shaft 13 has secured thereon another arm 31 (Fig. 2), both said arms supporting a cross rod 32.

Further, the shaft 23 has mounted thereon a gear 33 being, through two intermediate pinions 35 and 36 rotatably mounted on stationary pins of an interposed wall, in engagement with a gear 38 fast to a tube 37 (Fig. 2) surrounding the shaft 13 and rotated, during each machine operation, in the direction opposite to that of the crank.

Key banks

Each differential device is associated with a key bank 39 (Fig. 1). If the key bank is an amount key bank, it comprises nine keys, however, a key bank allotted to other purposes, for instance for setting up months of a date, may contain up to twelve keys.

In each key bank, besides a detent 40 (Fig. 2) provided to keep depressed any key operated, a second detent or a slide 41 (Fig. 1) is mounted which is shifted downwardly by means of a pin 42 of the depressed key acting upon its respective oblique edge 43.

The slide 41 is connected by means of a link 44 with a zero stop pawl 46 rotatably mounted on a shaft 45 which pawl normally bears against a stationary pin 89 by the action of a torsion spring 47 coiled about the shaft 45. When the said pawl is in normal position, a flange 91 thereof extends over a latch 48 of the differential device holding it in zero position. When, however, an amount key 39 has been depressed and by means of its pin 42, the slide 41 is shifted into its lower position, the link 44 causes the pawl 46 to rotate counter-clockwisely against the action of its spring 47, and the flange 91 is moved out of the path of the latch 48. Now the latch 48 is enabled to be rocked upwardly and to be arrested by the foot of the depressed key 39.

Differential device

Figure 2:
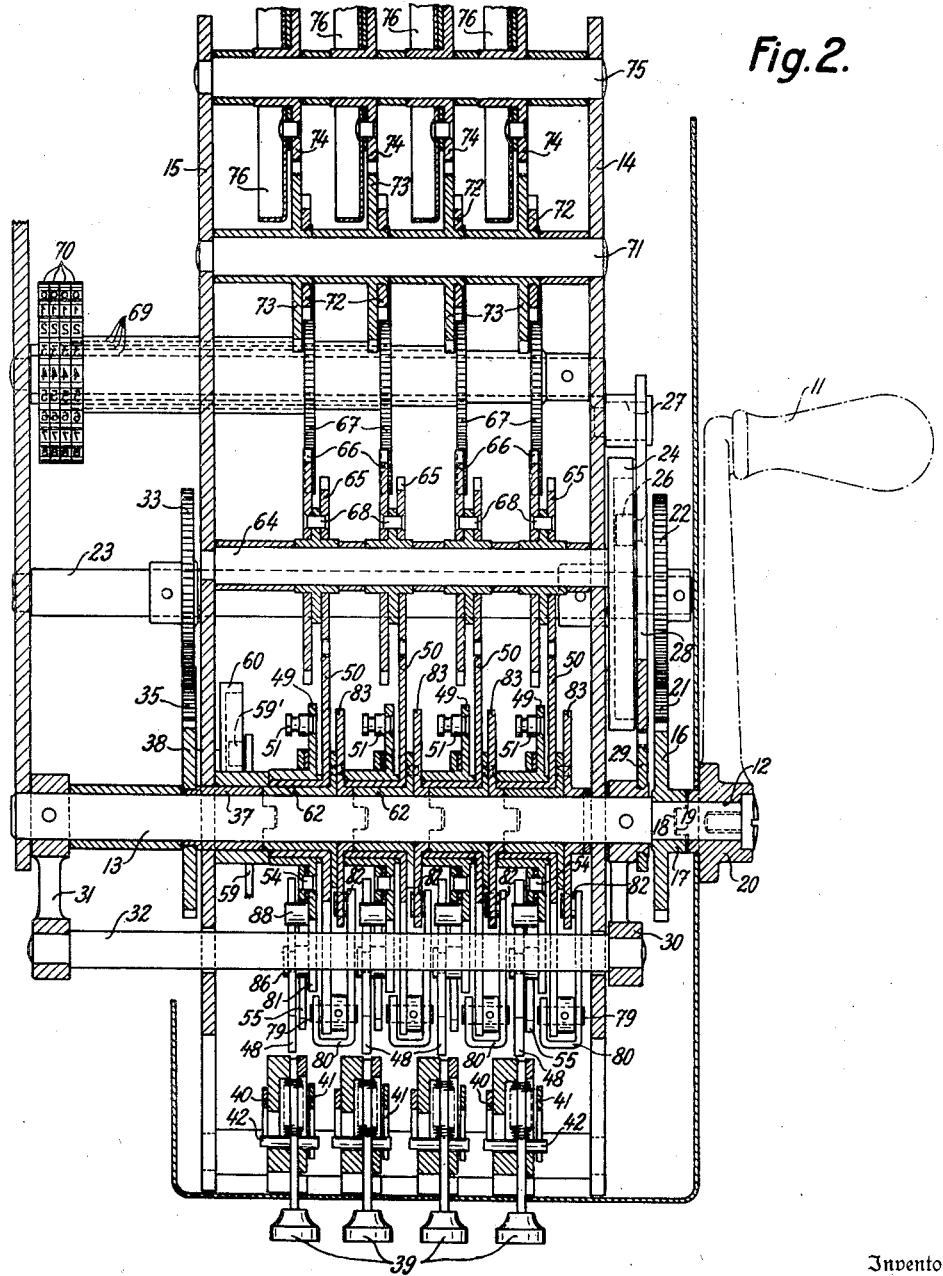
Fig. 2 is a transversal section through the machine along line A—B of Fig. 1.

Each differential device comprises a main setting member 49 (Fig. 1) rotatably supporting the latch 48 and rotatably mounted on the hub of a respective auxiliary setting member 50 (Fig. 2).

Fast to a pin 51 of each of the setting members 49 is a spring 53 tending to rotate it clockwisely and, thus, to bear against the cross rod 32. By pins 54 each setting member 49 is connected to a toothed segment 55 with the teeth of which an adding wheel 56 rotatably mounted on a shaft 57 supported by two arms 59 fast on a shaft 58, can be brought in engagement for adding actions by a roller 59' secured to one of the arms 59 and guided in a cam groove 60' of a cam disk 60. For total and subtotal taking differently shaped cam disks are shiftably arranged in any known manner (not shown). Each adding wheel 56 is provided with a tens transfer disk 56' by which the adding wheel of next higher denominational order will be advanced when the first named wheel has passed from 9 to 0. The ratio of gearing between the segment 55 and the adding wheel 56 is such, that the adding wheel 56 is advanced by two teeth when the segment 55 rotates through the distance between two keys 39. When the totalizer is disengaged from the segment 55, a spring pressed pawl 61 prevents unintentional displacement of the adding wheels 56.

The auxiliary setting members 50 provided in each differential device, are rotatably mounted on tubes 62 mounted over the shaft 13 which tubes are interconnected with each other by tongues and grooves, and of which tubes the outmost left hand one as per Fig. 2 is connected in the same manner with the tube 37. The teeth 63 of each auxiliary setting member 50 is in mesh with a gear rotatably mounted on a shaft 64. Each gear 65 is fastened by pins 68 to a gear 66 meshing with a gear 67. The gears 67, on the one hand, are connected by means of nested tubes 69 to the type wheel 70 of the printer, on the other hand, they are in mesh with gears 74 through intermediate gears 72, 73 rotatably arranged on a shaft 71. The gears 74 are rotatably mounted on a shaft 75 and connected each with an indicator wheel 76. The indicator wheels 76 are visible through a window 77 of the machine frame.

A stud 79 of each auxiliary setting member 50 has pivoted thereon a bail formed coupling member 80. The one arm of the member 80 is pointed and able to engage the notches 81 of the respective setting member 49. The other arm of the coupling member 80 carries a roller 82 cooperating with a cam disk 83 rotatably mounted on the shaft 13 and connected to the respective tube 62. By means of a spring 84 tensioned between the coupling member 80 and the auxiliary setting member 50, the pointed arm is normally held disengaged from the notches 81.

The device operates as follows:—

Assuming that the zero stop pawl 46 has been rocked to free the latch 48 by depressing an amount key. During the machine operation effected by turning the crank 11, the shaft 13 and thereby also the cross rod 32, is rocked first in clockwise direction (Fig. 1) by means of the gearing 16 to 29. The setting member 49 together with the segment 55 partakes in this clockwise rocking under the action of its spring 53, till the latch 48 strikes the foot of the depressed key 39, whereby the setting member 49 is prevented from continuing its movement. Further, during its clockwise rotation the cross rod 32 meets the auxiliary setting member 50 and restores it as well as the type wheels 70 by means of the gearing 65 to 69 and the indicator wheels 76 by means of the gearing 71 to 74 to zero position. When the auxiliary setting members 50 have returned to their zero positions, the oblique edges 85 of the cam disks 83, performing during any machine operation a full revolution in counter-clockwise direction, strike the rollers 82 and force the pointed arms of the coupling members 80 to engage, against the action of their springs 84, the notches 81 of the main setting members 49 which were set in accordance with the depressed keys 39. For an adding operation, the adding wheels 56 are, at this time, engaged with the segments 55 by means of rocking the totalizer frame 57 to 59 by the cam disk 60 in the groove 60' by which the roller 59' of the frame arm 59 is actuated. For total and subtotal taking differently shaped cam disks are shifted in any suitable manner into operative position, as already mentioned above. Thereupon the shaft 13 starts its counter-clockwise rocking movement and the cross rod 32 restores the main setting members 49 to rest positions against the action of their springs 53. The segments 55 connected with the setting members 49, actuate the engaged adding wheels 56 in accordance with the depressed keys 39. At the same time, the auxiliary setting members 50, coupled with the setting members 49 by the coupling member 80 actuated by the cam disk 83, are rocked out of their zero positions by a number of steps corresponding to the value of the key 39 depressed. Due thereto, also the type wheels 70 and the indicator elements 76 are set to the like amount. After setting the type wheels 70 and the indicator wheels 76 is finished, the cam portion of greater diameter of the cam disk 83 leaves the roller 82 so that the coupling member 80 under the action of the spring 84 is disengaged from the teeth 81 of the main setting member 49. After the return movement of the setting member 49 has finished, the adding wheels 56 are disengaged from the segments 55.

The keys 39 are not interlocked during the machine operation. Thus it is possible, during the machine operation, to release the depressed key 39 by pressing another key of the same bank. However, when the setting member 49 is set according to the key depressed, and if a key of lower value is depressed in the same bank, the differential device is not affected because the latch 48 is pivoted on the pin 86 of the setting member 49, as already pointed out, and bearing normally under the action of a spring 87 against a stop pin 88 of the setting member 49. Thus, if the latch 48 meets a depressed key on its return movement, the latch will be rocked against the action of the spring 87 and by-pass the depressed key.

If the differential device described is not to be used in connection with amount key banks, but for registering data not to be added, the segments 55 are omitted. In this case the zero stop pawl 46 can be made use of in any other way or entirely dispensed with and a stationary stop 96 be provided to arrest the setting members when no key has been depressed in the respective key bank.

While the form of mechanism herein shown and described, is admirably adapted to fulfill the objects primarily stated, it is to be understood that it is not intended to confine the invention to the embodiments herein disclosed, for it is susceptible of embodiment in various other forms all coming within the scope of the claims which follow.

What is claimed as new is:

1. In a differential mechanism having a power operated setting member differentially adjustable from a normal position, manipulative devices to control the differential adjustment of the setting member, and a settable element, the combination of a coupling device carried by the settable element, and a means directly cooperable with the coupling device to engage the coupling device with the setting member after the setting member has been differentially adjusted, whereby the settable element is adjusted according to the adjustment of the setting member while the setting member is being restored to its normal position.

2. In a differential mechanism having a power operated notched setting member differentially positionable from a normal position, manipulative devices to control the differential adjustment of the setting member, and a settable element, the combination of an angularly bent coupling lever pivoted on the settable element, and a cam to rock the coupling lever into position to engage a notch of the setting member after the setting member has been differentially adjusted, whereby the settable element is adjusted according to the differential adjustment of the setting member when the setting member is returned to its normal position.

3. In a differential mechanism having a power operated differentially positionable setting member, manipulative devices to control the differential adjustment of the setting member, and a settable element, the combination of a coupling lever pivoted on the settable element, resilient means to normally maintain the coupling lever in its uncoupling position, a cam to actuate the coupling means to move the coupling means into position to couple the settable element to the setting member after the setting member has been differentially adjusted, whereby the settable element is adjusted by the differentially positioned setting member when the member is returned from its adjusted position.

4. A differential member, means to control the differential positioning of the member, means to move the member from a normal position into a differentially adjusted position and back to normal position during a machine operation, and a settable element, in combination with a coupling lever carried by the element, resilient means to urge the lever to uncoupling position, and a cam rotatable for moving the coupling lever into position to engage the member prior to its movement back to normal position and to so maintain the coupling lever while the member returns to normal position, whereby the element is set according to the differential adjustment of the member.

ERNST BREITLING.
JULIUS PATZELT.